(12) United States Patent
Sanpitak

(10) Patent No.: US 7,493,806 B2
(45) Date of Patent: Feb. 24, 2009

(54) IN-SYSTEM TEST FOR ELECTROMECHANICAL BRAKE SAFETY REDUNDANCY

(75) Inventor: Patanit Sanpitak, Highland Park, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 126 days.

(21) Appl. No.: 11/770,773

(22) Filed: Jun. 29, 2007

(65) Prior Publication Data

US 2009/0000369 A1 Jan. 1, 2009

(51) Int. Cl.
*G01L 5/28* (2006.01)

(52) U.S. Cl. .......................................... 73/121; 303/20
(58) Field of Classification Search ........... 73/121–132; 303/20
See application file for complete search history.

(56) References Cited

U.S. PATENT DOCUMENTS

| | | | | |
|---|---|---|---|---|
| 3,866,980 A * | 2/1975 | Eisele et al. | ............. | 303/122.1 |
| 5,632,530 A * | 5/1997 | Brearley | ............. | 303/22.1 |
| 5,717,134 A * | 2/1998 | Schlichenmaier et al. | ..... | 73/121 |
| 6,131,450 A * | 10/2000 | Decker et al. | ............. | 73/121 |
| 6,345,225 B1 * | 2/2002 | Bohm et al. | ............. | 701/70 |
| 6,390,565 B2 * | 5/2002 | Riddiford et al. | ............. | 303/3 |
| 6,969,127 B2 * | 11/2005 | Suzuki et al. | ............. | 303/20 |
| 7,017,211 B2 * | 3/2006 | Krywiczanin et al. | ............. | 5/622 |
| 7,055,660 B2 * | 6/2006 | Friesen | ............. | 188/265 |
| 7,448,701 B2 * | 11/2008 | Nilsson et al. | ............. | 303/167 |
| 2004/0011779 A1 * | 1/2004 | Krywiczanin et al. | ............. | 219/217 |
| 2004/0201270 A1 * | 10/2004 | Suzuki et al. | ............. | 303/20 |
| 2005/0179380 A1 * | 8/2005 | Bohm et al. | ............. | 303/155 |
| 2006/0162076 A1 * | 7/2006 | Bartlett et al. | ............. | 5/607 |

* cited by examiner

*Primary Examiner*—Harshad Patel
*Assistant Examiner*—Freddie Kirkland, III
(74) *Attorney, Agent, or Firm*—Peter L. Kendall

(57) ABSTRACT

A test unit is electrically coupled between a motion controller and each of first and second redundant brakes. The test unit is responsive to the motion controller for automatically selecting one of the brakes to be tested. A microcontroller receives a signal from the motion controller that identifies one of the redundant brakes for activation, or deactivation, by an associated microcontroller output. The microcontroller outputs may be coupled respectively to activation terminals of respective brake switches connected in parallel to a brake activation voltage.

16 Claims, 3 Drawing Sheets ics base directly connects the ground terminal to node 18 and
IN-SYSTEM TEST FOR ELECTROMECHANICAL BRAKE SAFETY REDUNDANCY

FIELD OF THE INVENTION

The present invention relates to electrical safety brake redundancy testing. More particularly, the present invention relates to electrical control of two brakes independently when redundancy testing is performed.

BACKGROUND

Brake safety redundancy is an important requisite in a variety of contexts. For example, in a gamma camera system used for molecular imaging, some motion axes can be moved freely by gravitational force. A motion controller is an electronics assembly sub system that controls all of the gamma camera motion axes. Examples of gamma camera motion axes are camera rotation, camera radial movement and patient bed up/down movement. Each motion axis generally includes an electric motor with mechanical gearing, electric brake(s), position feedback sensors (i.e. optical encoder, potentiometer) and travel limit sensors.

The motion controller performs a closed-loop control on each motion axis in order to move the camera to the desired position at the desired velocity. The motion controller also controls the electrical brake for a motion axis that requires position holding when power is not applied to the electric motor, thereby to prevent free movement by gravitational force. For such axis, two brakes are normally provided redundantly for safety. The brakes are used to hold their positions when the motion controller is off, to stop motion when the system loses power, or in a system emergency stop condition. In normal operation, both brakes are controlled to release or engage simultaneously. If one of the brakes fails in its release condition, the motion axis loses its brake safety redundancy without detection of the failure.

In order to reduce the probability of failure, preventive maintenance is routinely performed. During preventive maintenance, each brake is tested independently to verify that it can hold the load against gravity by itself. For an axis motion controller that has two independent brake controller/drivers, the test can be done automatically. However, if the motion controller has only one brake controller/driver, the test requires service personnel to perform manual tasks of connecting and disconnecting each brake during the test.

FIG. 1 is a block diagram of conventional brake redundancy testing with a single brake controller/driver. Electromechanical redundant brakes 10 and 12 are each engaged with an axis 14 of motion device 15 when no voltage is applied to energize associated brake coils 11 and 13. While the motion device 15 is exemplified as a diagnostic camera device for simplicity, the motion device is representative of any of a variety of equipment for which redundant brake capability is desirable. Brake coils 11 and 13 are physically connected in parallel at nodes 16 and 18 in motion distributor board 20.

Motion electronics base 22 comprises input terminals for coupling to supply lines $V_0$ and ground. The motion electronics base directly connects the ground terminal to node 18 and connects the $V_0$ terminal to node 16 through supply switch 24 and brake driver switch 26. Switches 24 and 26 may be electronic switches under control of motion controller 30. Motion electronic base 22, for example, may correspond to the controller for the Siemens e.cam series cameras. The motion controller 30 contains various subsystems for operation of the motion device 15, including control of axis rotation, radial drive, patient handler in/out and up/down axes, left/right gantry motion, motion detection, emergency stop controls, and brake testing. This functionality is schematically indicated by the coupling of the motion controller 30 to the device 15 by link 32.

Brakes 10 and 12 are released from the axis 14 when supply switch 24 and brake driver 26 are activated by the motion controller 30 to apply input power to brake coils 11 and 13. When the brake driver switch 26 is turned off, both brakes are engaged. In order to test brake redundancy during a preventive maintenance test, a service technician must gain access to the motion distributor board 20 to manually disconnect one of the brakes from the nodes 16 and 18 in order to test only one brake function at a time. After the first brake is tested, it must be disconnected and the other brake connected, these functions also manually performed. Removal of system covers to gain access to the brakes for the connections and disconnections can be time consuming.

A need thus exists for attaining brake redundancy testing in a single controller system that does not require manual intervention by service personnel and that provides the redundancy testing without delay.

DISCLOSURE

The above described needs are fulfilled, at least in part, by a test unit that is electrically coupled between a motion controller and each of first and second redundant brakes. The test unit is responsive to the motion controller for selecting one of the brakes to be tested. A microcontroller receives a signal from the motion controller that identifies one of the redundant brakes for activation by an associated microcontroller output. The microcontroller outputs may be coupled respectively to activation terminals of respective brake switches connected in parallel.

The input voltage signal received by the microcontroller from the motion controller may be a coded pulse signal that is used both for identifying selection of the brake to be tested as well as for supplying operating voltage for brake activation. This input signal voltage is converted by a voltage regulator to a direct current voltage for supplying the microcontroller. A voltage divider may be provided for scaling the signal appropriately for a control input of the microcontroller. Thus, brake redundancy tests can be performed automatically, without the need for physical disconnection and reconnection of the brake coils.

Additional advantages of embodiments of the present invention will become readily apparent to those skilled in this art from the following detailed description, wherein only an exemplary embodiment of the invention is shown and described, simply by way of illustration of an exemplary best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawing and in which like reference numerals refer to similar elements and in which.

DETAILED DESCRIPTION

Figure 1:
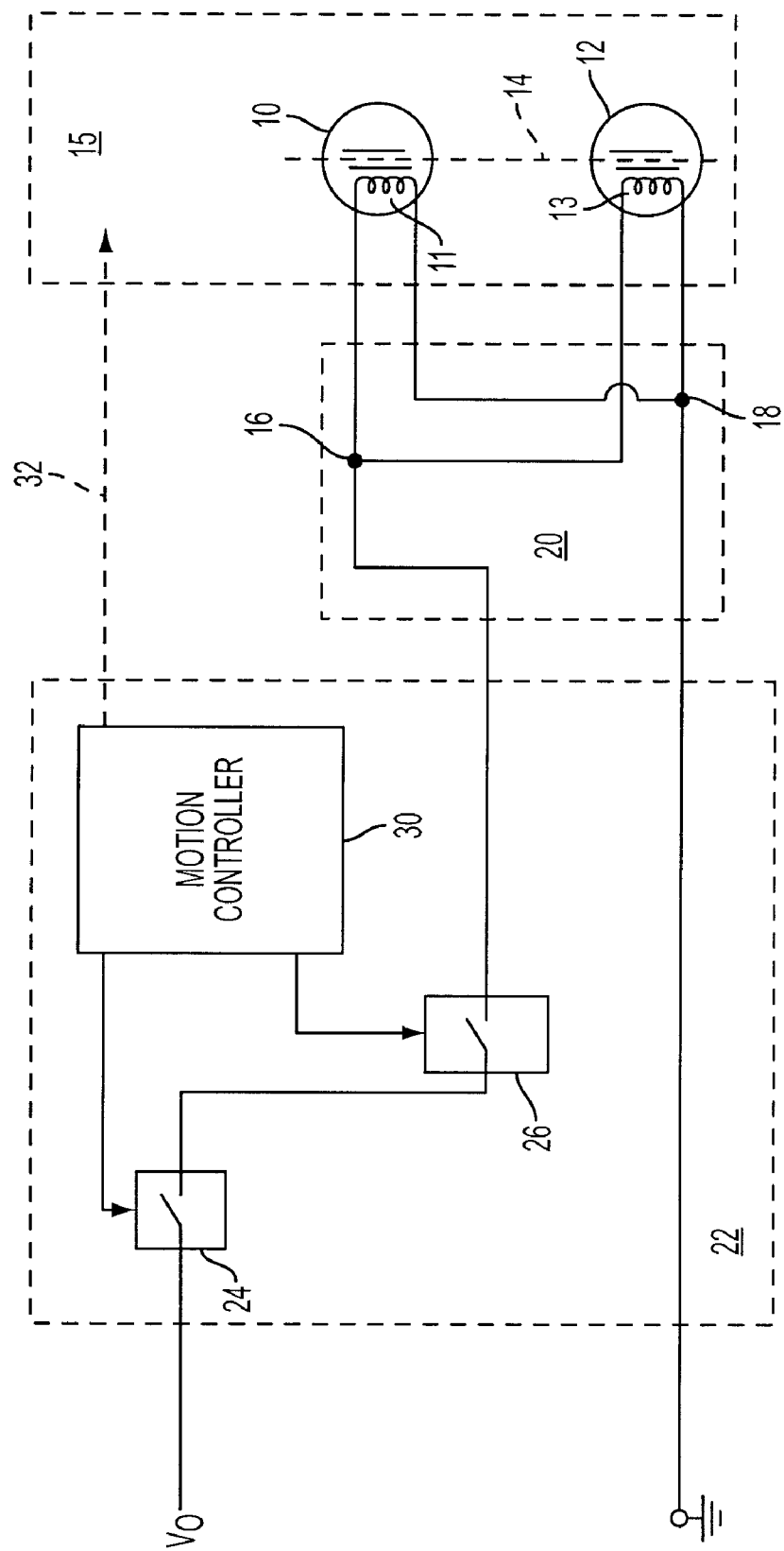
FIG. 1 is a block diagram of conventional brake redundancy testing with a single brake controller/driver.
Figure 2:
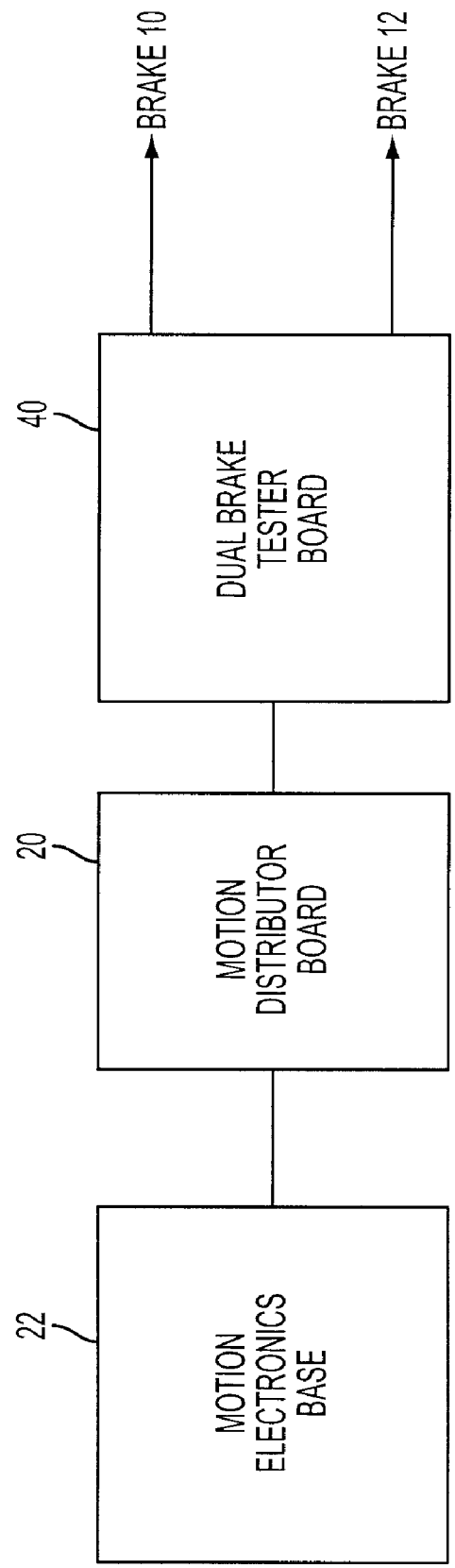
FIG. 2 is a simplified block diagram of brake redundancy testing in accordance with an embodiment of the present invention.

FIG. 2 is a simplified block diagram of brake redundancy testing in accordance with an embodiment of the present invention. Dual brake tester board 40 comprises electronic circuitry that provides selective connection of brakes 10 and 12, individually or redundantly, to the motion electronics base 22 via the motion distributor board 20. The motion electronics base 22 and the motion distributor board 20 may comprise elements such as described with respect to FIG. 1.

The dual brake tester board 40 provides the single brake controller/driver on the motion electronics base with the ability to control each brake independently. Therefore, brake redundancy tests can be performed automatically in a manner that heretofore was obtained only with two independent brake controller/drivers. The dual brake tester board 40, in conjunction with the single brake controller 30 of the motion electronics base 22, eliminates manual tasks previously required during performance maintenance brake redundancy testing, and reduces performance maintenance time. The dual brake tester board is also conducive to retrofitting existing motion control systems having single brake controllers.

Figure 3:
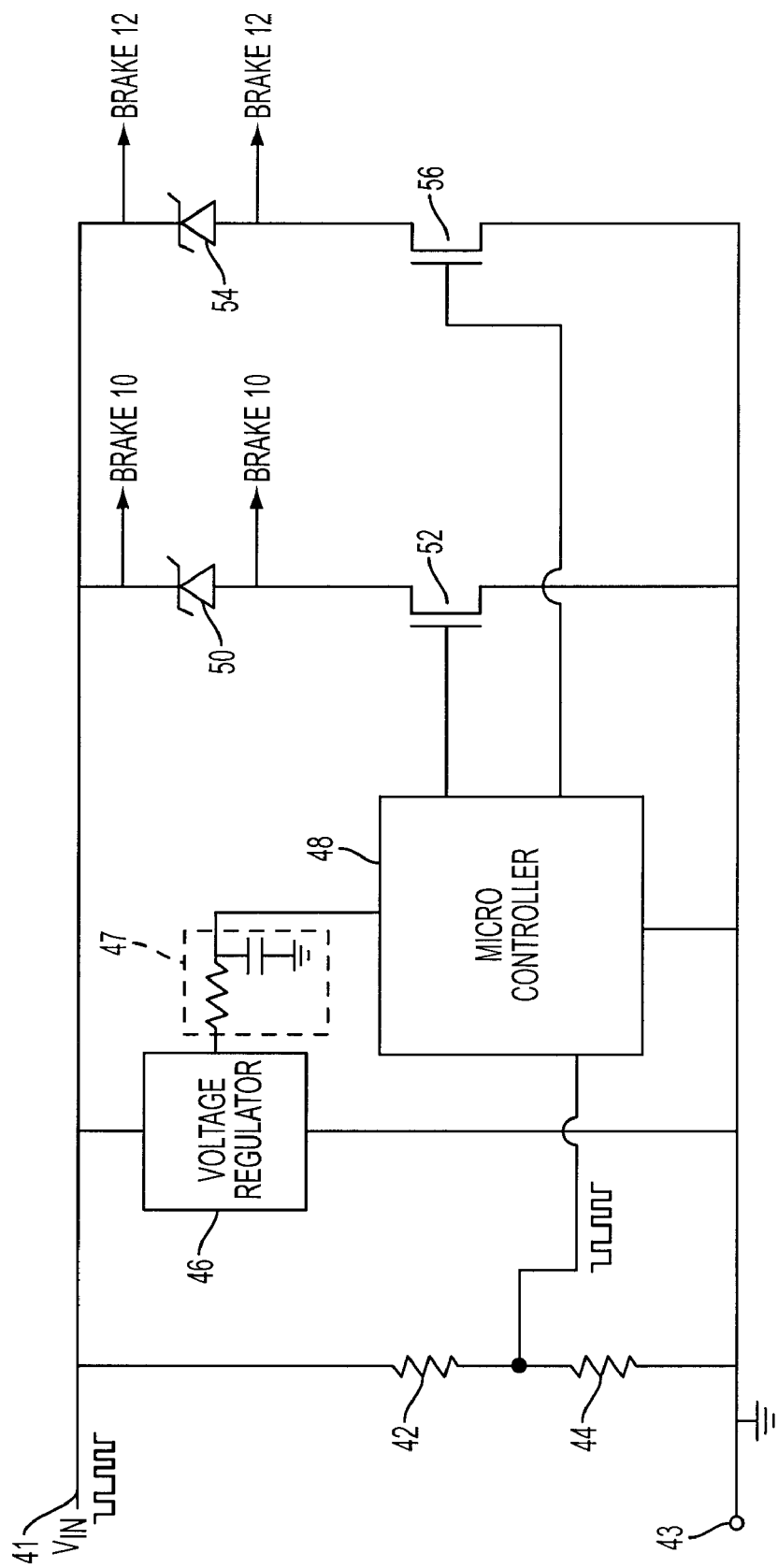
FIG. 3 is a block diagram of an electronic dual brake tester board applicable for the system of FIG. 2 in accordance with an embodiment of the present invention.

FIG. 3 is a block diagram of an exemplary electronic dual brake tester board 40. The tester board connects to the motion electronics base 22 via the motion distributor board 20. The signal $V_{IN}$ and ground are received from motion controller 30 in the motion electronics base 22 at input terminals 41 and 43. A voltage divider, represented by resistors 42 and 44, is connected across the input terminals. Voltage regulator 46 is connected in parallel with the voltage divider. Voltage regulator 46 may comprise a well known regulator, such as the commercially available LM78L05. The output of voltage regulator 46 is connected to microcontroller 48, which is grounded. Microcontroller 48 may comprise a well known microprocessor, such as the commercially available PIC12F683. The junction of resistors 42 and 44 is connected to a signal input of microcontroller 48. Diode 50 and controlled switch 52 are connected in series across input terminals 41 and 43. Diode 54 and controlled switch 56 are connected in series across input terminals 41 and 43. Diodes 50 and 54 may comprise conventional impedance devices. Coil 11 of brake 10 is coupled across diode 50. Coil 13 of brake 12 is coupled across diode 54. A first output of microcontroller 48 is coupled to the control terminal of switch 52. A second output of microcontroller 48 is coupled to the control terminal of switch 56.

In normal operation, when controller 30 turns on brake driver switch 26 in the motion electronics base 22, the voltage $V_O$ is applied via motion distributor board 20 to the input terminal 41. $V_O$ is of a magnitude sufficient to activate the brake coils, typically on the order of 24 VDC. Regulator 46 provides a supply voltage, typically on the order of 5 VDC to microcontroller 48. Switches 52 and 56 are biased by microcontroller 48 to the on state to apply $V_O$ to, and release, both brakes. When the controller 30 turns off brake driver switch 26, no voltage is applied to input terminal 41 and both brakes are engaged. Therefore, in normal operation, the dual brake tester board 40 is transparent to the controller 30.

For testing brake redundancy, controller 30 first turns on brake driver switch 26 to initialize the circuit 40. The controller 30 then generates a sequence of command pulses by controlling the on and off states of the brake driver switch 26. Input terminal 41 thus receives a pulse coded signal, as illustrated. Preferably, the switching frequency is at least twenty times faster than the brake response time. The pulsed command can be any kind of Not-Return to-Zero (NRZ) asynchronous serial type interface that the microcontroller can decode, such as a standard UART type interface, pulse width coded type interface, etc. Only a few command tokens are needed to communicate with the circuit 40 to perform the test, for example, turn brake 10 off/on, turn brake 12 off/on.

The microcontroller can operate at a very low voltage and current supply. Resistive/capacitive filtering 47 provides sufficient supply voltage filtering for the microcontroller during the short burst of pulse commands. The circuit 40 can be exemplified by the following characteristics. The microcontroller can operate with a wide operating voltage of, for example, 1.0V to 5.5V with less than 2 mA operating current at 5V, using an internal 8 MHz clock. The command interface may comprise a UART style with 1200 baud 8,N,1. Only two characters are needed for brake commands, for example: "WW"=brakes 10 and 12 ON; "Ws"=brake 10 OFF, brake 12 ON; "Wu"=brake 10 ON, brake 12 OFF; "Ww"=brakes 10 and 12 OFF.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein, for example, with other motion devices.

What is claimed is:

1. Apparatus comprising:
   first and second electrically controlled brakes operatively coupled to a motion device;
   a motion controller coupled to the motion device;
   a test unit electrically coupled between the motion controller and each of the first and second brakes;
   wherein the test unit is responsive to the motion controller for selecting one of the brakes to be tested.

2. Apparatus as recited in claim 1, wherein the motion device comprises a diagnostic camera system.

3. Apparatus as recited in claim 2, wherein the first and second brakes are coupled to the same camera system structure for providing safety redundancy.

4. Apparatus as recited in claim 1, wherein the test unit comprises:
   a voltage regulator coupled to the motion controller for converting an input voltage signal received from the motion controller to an output voltage;
   a microcontroller having an input coupled to the output voltage of the voltage regulator, the microcontroller comprising first and second outputs coupled respectively to the first and second brakes.

5. Apparatus as recited in claim 4, wherein the microcontroller further comprises a signal input coupled to the motion controller to receive therefrom a signal identifying of one of the first and second microcontroller outputs for activation by the microcontroller.

6. Apparatus as recited in claim 5, wherein the signal received from the motion controller is a coded pulse signal.

7. Apparatus as recited in claim 6, wherein the input voltage received by the voltage regulator from the motion controller is the coded pulse signal.

8. Apparatus as recited in claim 7, wherein the first and second microcontroller outputs are coupled respectively to activation terminals of first and second switches, the first and second switches connected in parallel to the input voltage received from the motion controller.

9. Apparatus as recited in claim 8, further comprising impedance devices connected in series, respectively, with the first and second switches and wherein the first and second brakes are connected electrically in parallel with the respective impedance devices.

10. A method comprising the steps of:
coupling first and second electromechanical brakes to a motion device to restrain motion of the device;
selectively electrically decoupling one of the brakes from the motion device;
testing the other of the brakes while maintaining electrical decoupling of the one brake from the motion device.

11. A method as recited in claim 10, further comprising the steps of:
recoupling the one brake to the motion device;
selectively electrically decoupling the other brake from the motion device; and
testing the one brake while maintaining electrical decoupling of the other brake from the motion device.

12. A method as recited in claim 10, wherein the step of selectively decoupling comprises generating a coded pulsed signal associated with the one brake.

13. A method as recited in claim 12, wherein the step of selectively decoupling further comprises applying a voltage output in response to the coded pulse signal to the one brake to release the one brake from the motion device.

14. A dual brake tester unit comprising:
an input coupled to a pulse coded signal;
first and second outputs coupled to respective electromechanical brakes;
a voltage regulator coupled to the input to produce a direct current voltage output;
a microprocessor coupled to the voltage regulator output, the pulse coded signal and the first and second outputs.

15. A dual brake tester unit as recited in claim 14, further comprising a voltage divider coupled to the pulse coded signal, a control input of the microprocessor coupled to the voltage divider.

16. A dual brake tester unit as recite in claim 15, further comprising first and second controlled switches respectively coupled to the first and second outputs,
wherein each of the first and second switches are coupled the microprocessor for selective activation therefrom in response to the pulse coded signal.

* * * * *